United States Patent

[11] 3,564,143

[72] Inventor Victor E. Stewart Jr., South Milwaukee, Wis.

[21] Appl. No. 734,662

[22] Filed June 5, 1968

[45] Patented Feb. 16, 1971

[73] Assignee McGraw-Edison Company Milwaukee, Wis.

[54] MEANS FOR PROVIDING FOR YIELDING TO A HIGHER PRIORITY SERVICE IN A TELEPHONE SYSTEM

12 Claims, 5 Drawing Figs.

[52] U.S. Cl. .......... 179/2

[51] Int. Cl. .......... H04m 11/08

[50] Field of Search .......... 179/2, 2 (RC), 5; 324/62

[56] References Cited

UNITED STATES PATENTS

| | | | |
|---|---|---|---|
| 2,771,579 | 11/1956 | Ruge .......... | 324/62 |
| 3,266,018 | 8/1966 | Higgins.......... | 179/2 |
| 3,335,227 | 8/1967 | Jackel .......... | 179/2 |

*Primary Examiner*—Kathleen H. Claffy
*Assistant Examiner*—Douglas W. Olms
*Attorney*—Charles A. Prudell

ABSTRACT: A system including an impedance limit detector for detecting, at a central location, the resistance or impedance level of a test circuit such as remotely located elements of a telephone system. In particular, the device detects whether or not a telephone is "on hook" or "off hook." The detector compares the current flowing in a reference circuit with a current flowing in the test circuit and is effective over a wide range of circuit voltages. The system further includes means for removing auxiliary apparatus from the line when the telephone is "off hook."

PATENTED FEB 16 1971 3,564,143

SHEET 1 OF 2

INVENTOR.
Victor E. Stewart, Jr.
BY Thomas E Torphy
Attorney

PATENTED FEB 16 1971 3,564,143

INVENTOR.
Victor E. Stewart, Jr.
BY Thomas E Torphy
Attorney

MEANS FOR PROVIDING FOR YIELDING TO A HIGHER PRIORITY SERVICE IN A TELEPHONE SYSTEM

BACKGROUND OF THE INVENTION

The invention relates to devices for detecting the resistance of a system circuit and, more particularly, relates to a resistance level detector for determining whether a remotely located telephone is "on hook" or "off hook" and for subsequently discontinuing the operation of any auxiliary equipment on the same line if the telephone is sensed to be "off hook."

In a system such as disclosed in the copending application Ser. No. 690,980, by Victor E. Stewart, Jr., entitled "Remote Meter Reading System," filed Dec. 15, 1967 and assigned to the present assignee, it is possible to use telephone circuits to transmit data obtained by automatic remote reading of utility meters. In order to accomplish such remote reading of utility meters, a fairly high excitation voltage may be applied to the telephone lines by a device such as that disclosed in the copending application Ser. No. 711,705, by Victor E. Stewart, Jr., entitled "Means for Activating and Controlling a Remote Meter Reading System," filed Mar. 8, 1968, and assigned to the present assignee. By means of such an excitation voltage the operation of the remotely located meter reader is initiated and controlled. In order to eliminate any inconvenience to the telephone subscriber and to insure the availability of the telephone system for normal higher priority uses, it is desirable to discontinue the operation of such a meter reading system and disconnect the operation of such a meter reading system and disconnect the centrally located meter reader control means from the subscribers' lines when the phone is lifted off its cradle. Further, for safety reasons, it is desirable to remove the relatively high control voltage from the subscribers' lines immediately upon the lowering of the circuit resistance as would occur if, inadvertently, some portion of a human body were placed across the conductors of the telephone system or a system fault such as a short circuit occurred. Since the control voltage, as applied by the control circuit as described in the aforementioned application Ser. No. 711,705, is applied at a limited rate rather than as a step function in order not to cause ringing of the customer's telephone, the resistance level detector must be effective over the entire range of applied voltages.

SUMMARY OF THE INVENTION

It is, therefore, an object of the invention to provide a data transmission system utilizing a telephone system whereby the telephone system may be used either in a first mode of operation for transmission of normal telephone communication signals or in a second mode of operation for transmission of secondary data signals from auxiliary apparatus, the data transmission system including means for changing from the second mode to the first mode in response to a signal indicating a desire to use the telephone system for transmission of normal telephone communication signals.

It is another object of the invention to provide a circuit impedance limit detector which is effective at various voltages which may be continuously changing over a wide range.

It is a further object of the invention to provide a resistance limit detector device as heretofore described which is effective at various voltages which may be continuously changing over a wide range.

It is a more specific object of the invention to provide a resistance limit detector device which is effective in an automatic remote meter reading system within a telephone system to cause discontinuance of the operation of the meter reading system upon reduction of the circuit resistance below a preselected value as would occur if an attached or associated subscriber's telephone is placed in the "off hook" condition.

Other objects and advantages of the invention will become apparent upon reading the following description.

These objects are accomplished by providing a reference circuit which is subjected to the same voltage as the system or test circuit and by providing means for comparing the current flowing through the test circuit with the current flowing through the reference circuit. The voltage versus current characteristics of the two circuits are similar and may be nonlinear The device is provided with means for detecting the current flow in the test circuit, means for detecting the current flow in the reference circuit and means for comparing the outputs thereof and, in turn, providing an output indicative of the state of comparison. The system is further furnished with noise discriminator means for eliminating spurious outputs and providing an unambiguous output.

DESCRIPTION OF THE PREFERRED EMBODIMENT

Figure 1:
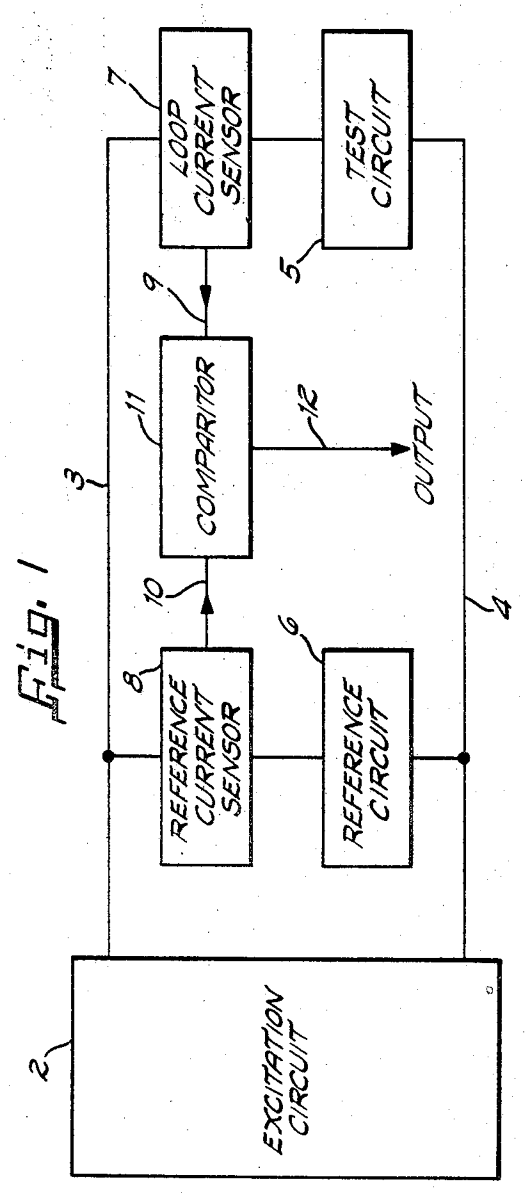
FIG. 1 is a generalized block diagram of a system embodying the present invention.

Referring to FIG. 1, there is shown a system comprising an excitation circuit 2 which may be of the type described in the aforementioned U.S. Pat. No., application Ser. No. 711,705 and is effective to apply an excitation voltage to conductors 3 and 4 for the purpose of initiating and controlling the operation of elements within a test circuit 5. The applied voltage may, for instance, be a positive 250 volts in conductor 3 with respect to conductor 4. For the purposes of comparison with test circuit 5, a reference circuit 6 is furnished. A loop current sensor 7 senses the magnitude of current flow through test circuit 5, and a reference current sensor 8 senses the magnitude of current flow through reference circuit 6. Loop current sensor 7 and reference current sensor 8 have outputs 9 and 10, respectively, which are compared by a comparator circuit 11. Comparator 11 provides an output 12 indicative of the state of comparison between the current through test circuit 5 and the reference circuit 6.

Figure 2:
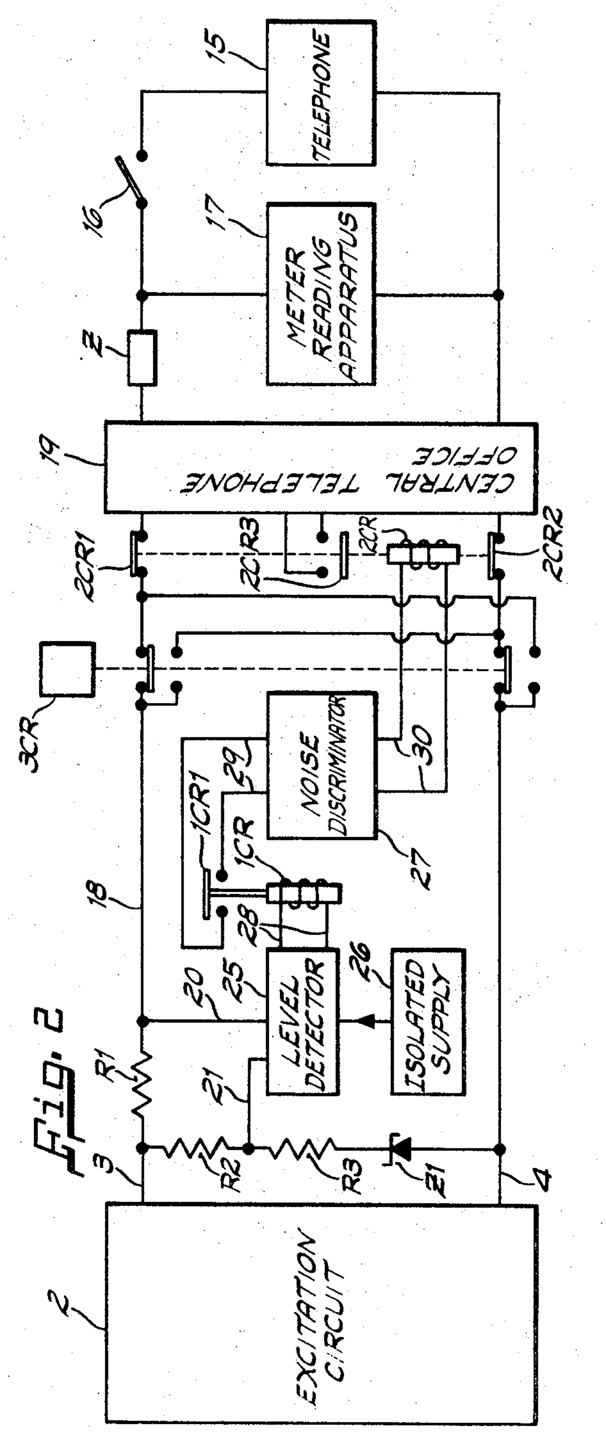
FIG. 2 is a more specific and detailed illustration of the system shown in FIG. 1.

The system diagram of FIG. 2 illustrates the invention as particularly applied to a meter reading system utilizing the transmission lines of a telephone system. In this application the loop current sensor 7 of FIG. 1 comprises a resistor R1, and the reference current sensor 8 comprises a resistor R2. The reference circuit 6 of FIG. 1 is specifically a resistor R3 and a Zener diode Z1. Resistor R3 and Zener diode Z1 are connected in series with resistor R2 between conductor 3 and conductor 4.

The test circuit in FIG. 2 comprises a telephone 15 connectable to the telephone system through a switch 16 and auxiliary apparatus such as a meter reading apparatus 17 connected in shunt of telephone 15 and switch 16. The test circuit consisting of telephone 15 and meter reader 17 is selectively connectable to conductor 4 and a conductor 18 through conventional appropriate switching devices at a central telephone office 19.

The current sensor outputs 9 and 10, as shown in FIG. 1, are represented in FIG. 2 by the magnitude of the voltages appearing respectively across resistors R1 and R2.

Comparator 11 of FIG. 1 is represented in FIG. 2 by the combination of a level detector 25 and isolated supply 26, a relay 1CR and a noise discriminator 27. Isolated supply 26 provides the electrical power to level detector 25. Level detector 25 is effective to compare the voltage appearing in conductors 21 and 20 and to provide an output through conductors 28 to the operating coil of relay 1CR. Relay 1CR has normally open contacts 1CR1 which may be closed by energization of relay 1CR to provide a signal to noise discriminator 27 through conductors 29. Noise discriminator 27 in turn provides an output through conductors 30 to a relay 2CR at central telephone 19 to open contacts 2CR at central telephone 19 to open contacts 2CR1 and 2CR2 and to thereby cause conductors 18 and 4 to be disconnected from the telephone system when telephone 15 is lifted from its cradle to cause closure of contacts 16. Contacts 2CR3 will thereupon close to signal conventional switching equipment at telephone office 19 to return the subscriber's line to normal telephone connection. Additional contact means may also be included to indicate to the supervisory control for the auxiliary apparatus that an interruption in the excitation sequence occurred. A conventional polarity reversal relay 3CR may be provided to reverse the polarity of the excitation voltage to the central office 19 without reversing the polarity of the voltage tested by the current sensors 8 and 7.

Figure 3:
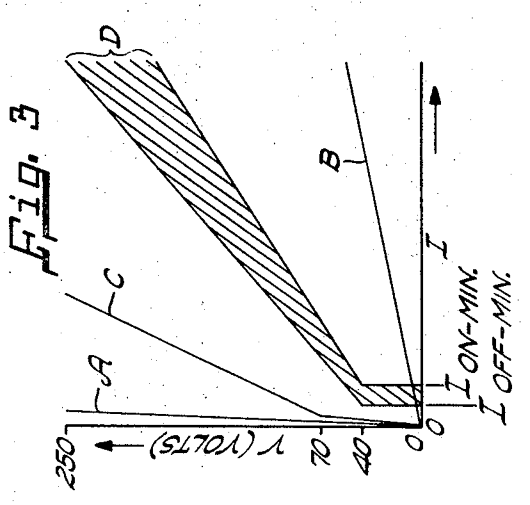
FIG. 3 is a graph illustrating the electrical operating characteristics of the system.

FIG. 3 graphically illustrates the voltage versus current characteristics of certain elements of the system and the operation of the system. The voltage V is that voltage which is applied to conductors 3 and 4 by excitation circuit 2. The current I is that current flowing through either the test circuit 5 or the reference circuit 6. Curve A illustrates conditions with the telephone 15 "on hook" so that switch 16 is open and with no meter reading apparatus 17 connected in the circuit. Therefore, the telephone circuit is for practical purposes open, and as the voltage increases, substantially no current flows through resistor R1 Curve B illustrates the circuit characteristics with the telephone 15 "off hook" so that switch 16 is closed. The current through resistor R1 is then determined by the impedance of the subscriber's loop impedance as represented by Z and the impedance of telephone 15. Telephone 15 has a relatively low impedance or resistance so that the current flow through resistor R1 increases rapidly as the voltage V increases. Curve C illustrates the circuit characteristics with a meter reading apparatus 17 connected across conductors 18 and 4, but with telephone 15 "on hook" so that switch 16 is open. The voltage versus current characteristics of the circuit are, therefore, governed by the impedance characteristics of meter reading apparatus 17 and the loop impedance Z.

Curve C illustrates the lowest V–I curve characteristic of all transponders of the type shown in the aforementioned application Ser. No. 690,980 which may be on the line. In other words, the transponder current response for any given excitation voltage will be less than that shown by curve C. The "break over" is chosen to be greater than any steady state voltage which might otherwise occur on the line.

The reference letter "D" denotes the detector band in which comparator 11 will operate. The spread between the "turn on" and "turn off" is due to hysteresis in the operating elements of the comparator 11. To approximate the breakover characteristic of curve C, Zener diode Z1 is inserted in the reference circuit to give a breakover characteristic of about 40 volts to increase the resolution of the level detector 21 at the low voltage end. Resistor R3 in the reference circuit 6 is chosen to give band D a slope greater than that of curve B and less than that of curve C to place the detector operating band D somewhere between curve B and C over substantially the entire operating current range of the system. The resistance level detection system will, therefore, be effective to detect when telephone 15 is lifted from its cradle at any time the meter reading apparatus is operating at any significant voltage level, not just at full voltage.

In FIG. 3, I on-min. represents the minimum current which will cause comparator 11 to operate or "turn on" and I off-min. is the minimum current at which comparator 11 will "turn off." These minimum currents are so small as to be of no significant concern in the operation of the system. The voltage at the intersection of the "turn on" curve and curve B represents the lowest voltage at which identification of the "off hook" condition can be guaranteed However, at voltages below station battery voltage (about 48 volts) there is no safety problem, and the duration of the intervals during which the excitation voltage remains below station battery voltage is very short. Therefore, delay in detection of the "off hook" condition due to the excitation voltage being below the station battery voltage is not significant in customer service or personnel protection.

From the foregoing, it can be seen that the change of impedance of the subscriber's telephone loop constitutes a signal indicative of the desire to use the telephone system in conjunction with telephone 15 for normal transmission of telephone communication signals.

Figure 4:
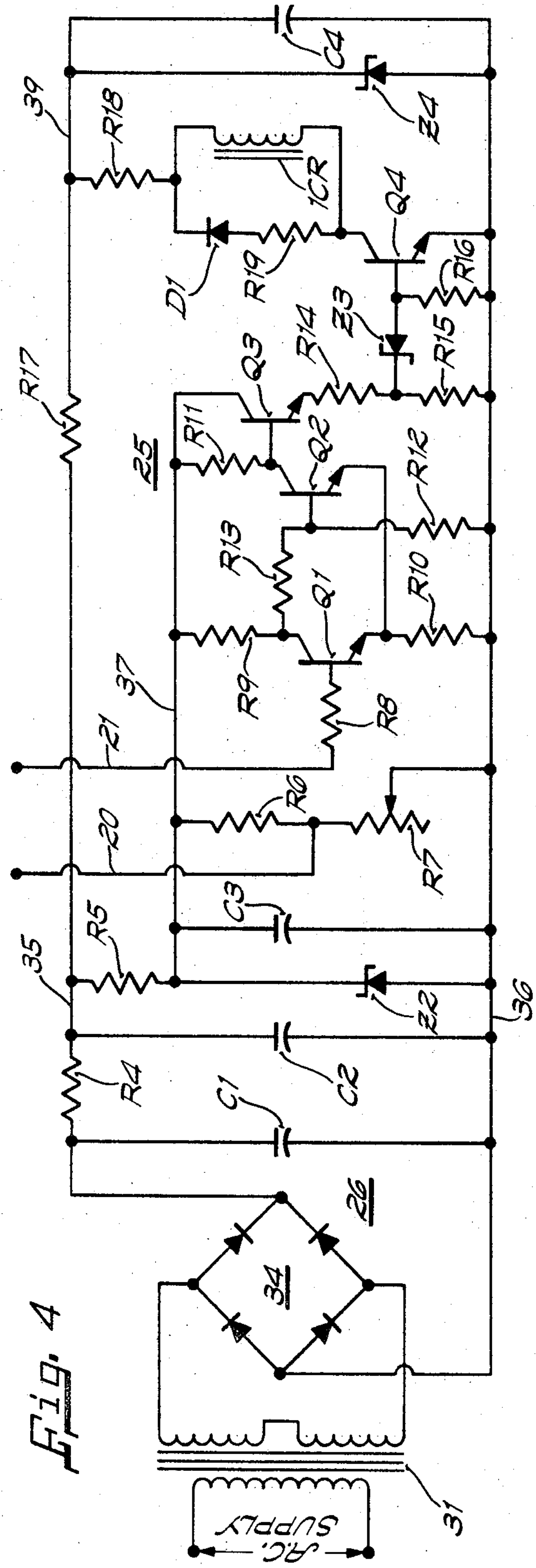
FIG. 4 is a schematic diagram of the level detector circuit shown in block form in FIG. 2.

The detailed circuitry of the level detector 25 and its isolated supply 26 is shown in FIG. 4. A power transformer 31 has its primary winding connected to a suitable source of alternating current power. The secondary of power transformer 31 is connected to the input terminals of a full wave bridge rectifier 34. A conventional filtering circuit comprising capacitors C1 and C2 and a resistor R4 is connected across the output terminals of rectifier bridge 34. A filtered DC voltage is thereby supplied to a positive conductor 35 and a negative conductor 36. Transformer 31 not only supplies power for the level detector 25, but also serves to isolate circuit 25 from the line voltage. Detector circuit 25 is, therefore, a "floating" detector circuit as it "floates" at the instantaneous potential of the line being monitored.

A resistor R5 and a Zener diode D2 are connected between conductors 35 and 36 to provide a regulated positive voltage at their juncture to a positive conductor 37. A capacitor C3 is connected between conductor 37 and conductor 36 for filtering purposes.

The test circuit current signal lead 20 is connected to the juncture of a fixed resistor R6 and a variable resistor R7 which are connected in series between positive conductor 37 and negative conductor 36, Variable resistor R7 may be adjusted to select the operating point of the level detector circuit 25.

The reference circuit current signal lead 21 is connected through a resistor R8 to the base of a transistor Q1. Resistor R8 is the input resistor to a conventional Schmitt trigger circuit comprising transistor Q1 and a transistor Q2. The collector of transistor Q1 is connected to positive conductor 37 by a resistor R9, and the emitter of transistor Q1 is connected to negative conductor 37 by a resistor R10. The collector of transistor Q2 is connected to positive conductor 37 through a resistor R11, and the base of transistor Q2 is connected to negative conductor 36 by a resistor R12. The emitter of transistor Q2 is connected to the emitter of transistor Q1. A resistor R13 connects the collector of transistor Q1 to the base of transistor Q2. As the test circuit current increases, the potential of conductor 20 decreases with respect to conductor 21. As conductor 21 becomes sufficiently positive with respect to conductor 20 and exceeds the threshold voltage of the Schmitt trigger circuit comprising transistors Q1 and Q2, transistor Q1 turns on and transistor Q2 turns off in a manner well known to those skilled in the art.

The base of an emitter follower transistor Q3 is connected to the collector of transistor Q2. The collector of transistor Q3 is connected to positive conductor 37. The emitter of transistor Q3 is connected through a resistor R14 and a resistor R15 in series to negative conductor 36. When transistor Q2 turns off, transistor Q3 turns harder to cause a rise in the voltage at the junction between resistors R14 and R15. The increased current through transistor Q3 enables a current to flow through a Zener diode Z3 to the base of a transistor Q4 to cause transistor Q4 to turn on. A resistor R16 connects the base of transistor Q4 to the negative conductor 36.

A regulated voltage is supplied for the operation of relay 1CR by providing a resistor R17 and a Zener diode Z4 in series between positive conductor 35 and negative conductor 36. A regulated voltage, therefore, appears in a conductor 39. A capacitor C4 is connected across Zener diode Z4 for filtering purposes. A diode D1 and a resistor R19 are connected in series across the coil of relay 1CR for voltage surge suppression.

When transistor Q4 turns on, a circuit is completed for the energization of relay 1Cr from positive conductor 39 through a resistor R18, the operating coil of relay 1CR, through the collector to emitter of transistor Q4 to negative conductor 36.

Figure 5:
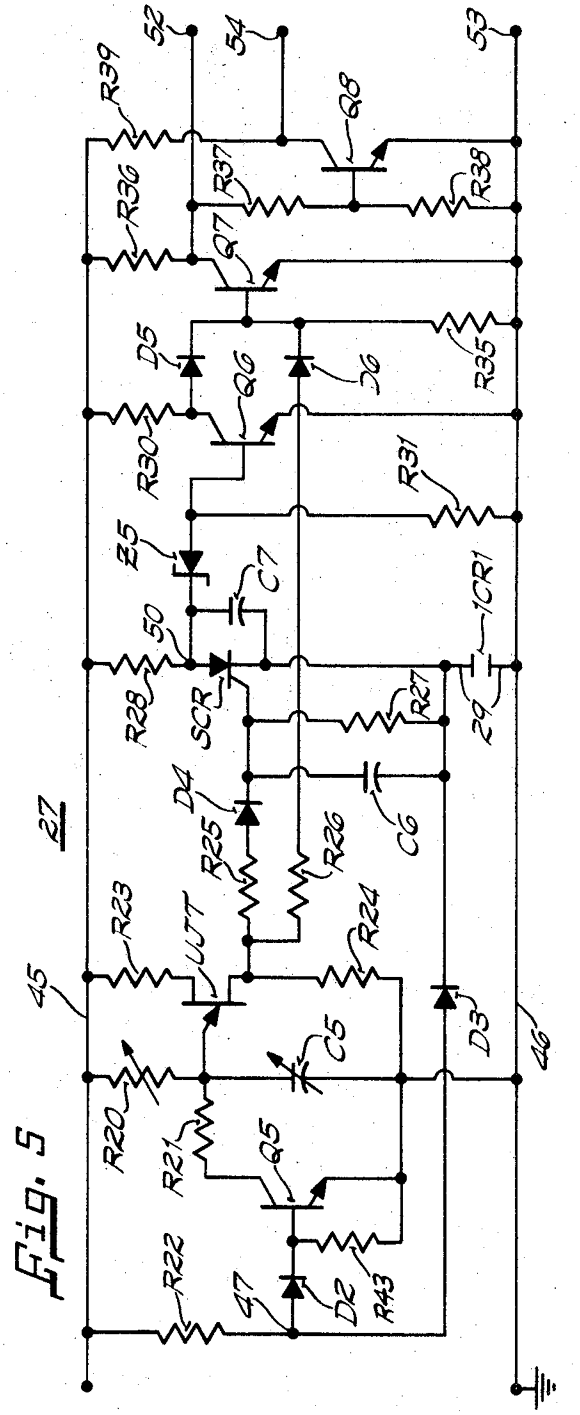
FIG. 5 is a schematic diagram of the noise discriminator circuit shown in block form in FIG. 2.

It can be seen thus far that, when telephone 15 is placed on line to close switch 16, the impedance of the test circuit is lowered to cause an increase in current through current sensing resistor R1. The potential of conductor 20 is, therefore, lowered with respect to conductor 21, and the circuit just described causes relay 1CR to be energized. FIG. 5 shows the detailed circuitry of the noise discriminator 27. Noise discriminator 27 is utilized in the system for two principal reasons. First, noise discriminator 27 incorporates time delay means to insure that the signal received through conductors 29, due to the closure of contacts 1CR1, is of longer duration than a preselected minimum. Thus, the effects of spurious signals due to induced transients in the system or contact bounce in contacts 1CR1 is eliminated. Secondly, noise discriminator 27 provides an output of sufficient duration to insure proper operation of switching apparatus in central telephone office 19.

Noise discriminator circuit 27, as shown in FIG. 5, is powered by a positive voltage applied to a positive conductor 45. A conductor 46 is grounded.

The time delay function within noise discriminator 27 is provided by a time delay circuit comprising a unijunction transistor UJT and a variable capacitor C5. Capacitor C5 charges through a variable resistor R20 which is connected in series with capacitor C5 between positive conductor 45 and ground conductor 46. A normally conductive transistor Q5 is connected in series with a resistor R21 in shunt of capacitor C5 to normally shunt charging current from capacitor C5. The base current to transistor Q5 flows through a resistor R22 and a diode D2. A resistor R43 is connected between the base and emitter of transistor Q5. When contact 1CR close, a circuit is completed from conductor 45 through resistor 22 and through a diode D3 to ground conductor 46. The voltage at point 47 therefore drops to stop the flow of base current to transistor Q5 through diode D2. Transistor Q5, therefore, turns off to interrupt the circuit in shunt of capacitor C5 and thereby permit the charging of capacitor C5 through resistor 20.

The base two of unijunction transistor UJT is connected to positive conductor 45 through a resistor R23. The base one of unijunction transistor UJT is connected to the ground side of capacitor C5 through a resistor R24. The positive side of capacitor C5 is connected to the emitter of unijunction transistor UJT. After a time delay which may be varied by adjustment of variable resistor R20 or variable capacitor C5 and which may be on the order of 10 milliseconds, capacitor C5 charges sufficiently that the emitter voltage of unijunction transistor UJT exceeds the threshold voltage of the unijunction transistor circuit, and capacitor C5 discharges through the emitter of unijunction transistor UJT to the base one of unijunction transistor UJT. The resulting positive pulse is delivered to two other circuit elements through resistors R25 and R26.

The pulse through resistor R25 passes through a diode D4 to the gate of a silicon controlled rectifier SCR. A capacitor C6 and a resistor R27 are connected in parallel between the gate and cathode of silicon controlled rectifier SCR. A capacitor C7 is connected between the anode and cathode of silicon controlled rectifier SCR to limit the change of voltage with time across silicon controlled rectifier SCR. When contacts 1CR1 close, the anode to cathode circuit of silicon controlled rectifier SCR is also completed through a resistor R28 from positive conductor 45 to ground conductor 46.

The firing of silicon controlled rectifier SCR is effective to turn off a normally conductive transistor Q6. The emitter of transistor Q6 is connected to ground conductor 46, and the collector of transistor Q6 is connected to positive conductor 45 through a resistor R30. A resistor R31 connects the base of transistor Q6 to ground conductor 46. The base current to transistor Q6 normally flows from positive conductor 45 through resistor R28 and through a Zener diode Z5 to the base of transistor Q6. The firing of silicon controlled rectifier SCR effectively connects point 50 to ground to prevent base current flow to transistor Q6 and, therefore, turns off transistor Q6. Zener diode Z5 blocks anode current to the silicon controlled rectifier SCR when the silicon controlled rectifier SCR is conductive.

The collector of transistor Q6 is connected through a diode D5 to the base of a normally nonconductive NPN transistor Q7. Similarly, resistor R26 is connected through a diode D6 to the base of transistor Q7. Diodes D5 and D6 connected to the base of transistor Q7. Diodes D5 and D6 connected to the base of transistor Q7 comprise a NOR gate, whereby current flow through either one of both of diodes D5 and D6 will cause transistor Q7 to be rendered conductive. A resistor R35 connects the base of transistor Q7 to ground conductor 46. The emitter of transistor Q7 is connected to ground conductor 46, and the collector of transistor Q7 is connected to positive conductor 45 through a resistor R36. It can be seen that, when telephone 15 is placed "on line" by the closure of switch 16, transistor Q7 will be rendered conductive and, consequently, the collector voltage appearing at an output terminal 52 will go from a higher voltage level to a lower voltage level to give indication that telephone 15 is "on line." This signal voltage change may be taken between output terminal 52 and an output terminal 53 connected to ground conductor 46.

If an inverted signal is required, the output signal appearing at a terminal 54 may be used. For this purpose, an inverting transistor Q8 is provided. The collector of transistor Q7 is connected to ground conductor 46 through series connected resistors R37 and R38. The junction point between resistors R37 R37 R38 is connected to the base of transistor Q8. The collector of transistor Q8 is connected through a resistor R39 to positive conductor 45. When transistor Q7 is nonconductive, a base current will flow to transistor Q8 through resistors R36 and R37. Accordingly, transistor Q8 will be normally conductive, and its collector voltage will normally be close to ground potential. When transistor Q7 is rendered conductive to indicate that telephone 15 is "on line," the gate current to transistor Q8 is removed and transistor Q8 is rendered nonconductive. Its collector voltage will, therefore, go from a lower voltage to a higher voltage to give a signal which is the inverse of that appearing at output terminal 52.

It is obvious that when telephone is taken "off line" by the opening of switch 16, the operation of the system will reverse and the signals appearing at terminals 52 and 54 will return to their original levels to indicate that telephone 15 is again "off line."

At first glance, it may appear that the signal through resistor R26 and diode D6 is redundant in producing a signal in addition to that produced by the firing of silicon controlled rectifier SCR. However, the signal through diode D6 is provided to insure that transistor Q7 is rendered conductive for a period of time sufficient to result in proper operation of equipment connected to the output of noise discriminator 27. If the contacts 1CR do not remain closed for a time sufficiently longer than the time delay of noise discriminator 27, silicon controlled rectifier SCR might not remain conductive for a time sufficiently long to produce the required signal pulse length. In the circuit shown, this minimum pulse length is insured because the discharge rate of capacitor C5 to the base one circuit of unijunction transistor UJT is chosen to provide a signal output of sufficient length.

Although the embodiment heretofore described is effective to accomplish the stated objects, it is not intended that the invention be limited to the described embodiment since it is subject to modification without departing from the scope of the appended claims.

I claim:

1. In a system including auxiliary apparatus utilizing the facilities of a telephone system for transmission of secondary data without interfering with the higher priority normal uses of said telephone system, the combination of:

telephone means;

telephone system means having an operative and a nonoperative connection to said telephone means for transmitting signals from one selected location to another;

auxiliary apparatus for producing secondary data signals, and for transmitting said secondary data signals over said telephone system means;

signal producing means located remotely from said telephone means and being responsive to the operative connection of the telephone system means to the telephone means to produce a signal indicative of a need to use said telephone system means in conjunction with said telephone means for transmission of telephone communication signals; and circuit means for providing a first mode of operation in which said telephone system means is operatively connected to said telephone means for transmitting normal telephone communication signals and for providing a second mode of operation in which said telephone system means is operatively connected to said auxiliary apparatus for transmitting said secondary signals, said circuit means being responsive to said signal producing means to cause a change from said second mode of operation to said first mode of operation.

2. The invention as defined in claim 1 in which said auxiliary apparatus comprises meter reading means for reading utility meters and for producing signals indicative of the meter reading thereby obtained.

3. In a meter reading system utilizing telephone lines:

a test circuit comprising a telephone and a meter reading apparatus connected in parallel relation across said telephone lines, said meter reading apparatus having a relatively high impedance and said telephone having a relatively low impedance when connected "line";

meter reading excitation means for applying a voltage to said test circuit, which voltage varies over a substantial range;

impedance testing means for determining whether said telephone is connected "on line" comprising, reference circuit means having an impedance between that of said telephone and that of said meter reading apparatus, said reference circuit being subjected to a voltage from said excitation means which is variable with said voltage applied to said test circuit; and current sensing and comparator means for comparing the current flow in said test circuit with the current flow in said reference circuit and for providing a third output indicative of the state of comparison to indicate whether said telephone is "on line."

4. The invention as defined in claim 3 together with switching means responsive to said third output for disconnecting said excitation means from said test circuit when said telephone is connected "on line."

5. The invention as defined in claim 3 in which:

said meter reading apparatus exhibits a breakover impedance characteristic in that substantially no current flows therethrough until a predetermined excitation voltage is exceeded; and said reference circuit includes a breakover device to give said reference circuit a breakover impedance characteristic in that substantially no current flows therethrough until said excitation voltage exceeds a predetermined level.

6. The invention as defined in claim 5 together with switching means responsive to said third output for disconnecting said excitation means from said test circuit when said phone is connected "on line."

7. In a system including auxiliary apparatus utilizing the facilities of a telephone system for transmission of secondary data without interfering with the higher priority normal uses of said telephone system, the combination of:

telephone means;

telephone system means having an operative and a nonoperative connection to said telephone means for transmitting signals from one selected location to another, said telephone system means also having a first impedance level when the telephone system means is nonoperatively connected to the telephone means and a second impedance level when the telephone system means is operatively connected to the telephone means;

auxiliary apparatus for producing secondary data signals and for transmitting said secondary data signals over said telephone system means;

signal producing means responsive to the change from the first impedance level to the second impedance level of the telephone system means to produce a signal indicative of a need to use said telephone system means in conjunction with said telephone means for transmission of telephone communication signals; and circuit means for providing a first mode of operation in which said telephone system means is operatively connected to said telephone means for transmitting normal telephone communication signals and for providing a second mode of operation in which said telephone system means is operatively connected to said auxiliary apparatus for transmitting said secondary signals, said circuit means being responsive to said signal producing means to cause a change from said second mode of operation to said first mode of operation.

8. The invention as defined in claim 7 in which said auxiliary apparatus comprises meter reading means for reading utility meters and for producing signals indicative of the meter reading thereby obtained.

9. The combination comprising:

first and second transmitting circuits each having an operative condition;

first circuit means connected to the first and second transmitting circuits and being effective to provide a communication circuit for said first and second transmitting circuits, said first circuit means having a first current level flowing therein in response to the operative condition of the first transmitting circuit and a second current level flowing in response to the operative condition of the second transmitting circuit;

signal producing means located remotely from the first and second transmitting circuits and having current of a predetermined level flowing therein, said signal producing means being effective to compare the current levels of the first circuit means with said predetermined current level and provide an output signal indicative of the state of comparison between the current levels; and second circuit means responsive to said third output signal to remove the first transmitting circuit from its operative condition.

10. The invention as defined in claim 9 further comprising excitation means for applying simultaneously variable voltages to both said first circuit means and said signal producing means whereby current flows in the first circuit means and signal producing means.

11. The invention as defined in claim 10 wherein said second circuit means comprises switching means for disconnecting the excitation means from the first circuit means.

12. The invention is defined in claim 9 wherein said signal producing means comprises:

a reference circuit having current of a predetermined level flowing therein;

first current sensing means for sensing said levels of current flow in said first circuit means and providing a first output signal indicative thereof;

second current sensing means for sensing the level of current flow in the reference circuit and providing a second output signal indicative thereof; and comparator means for comparing said first and second output signals and providing a third output signal indicative of the state of comparison between said first and second output signals.